United States Patent [19]
Lee

[11] Patent Number: 5,537,990
[45] Date of Patent: Jul. 23, 1996

[54] SOLAR WATER HEATING SYSTEM

[76] Inventor: Jia-Shing Lee, No. 477, Sheng-Li Rd., Nei-Pu Hsiang, Ping-Tung Hsien, Taiwan

[21] Appl. No.: 499,346

[22] Filed: Jul. 7, 1995

[51] Int. Cl.⁶ .................................................. F24J 2/44
[52] U.S. Cl. ...................... 126/638; 126/639; 126/641
[58] Field of Search .................................. 126/638, 639, 126/641, 710, 634, 678; 165/104.19

[56] References Cited

U.S. PATENT DOCUMENTS

| | | | |
|---|---|---|---|
| 3,390,672 | 7/1968 | Snelling | 126/636 |
| 4,240,405 | 12/1980 | French | 126/639 |
| 4,267,821 | 5/1981 | Nelson | 126/710 |
| 4,353,410 | 10/1982 | Godard et al. | 126/641 |

FOREIGN PATENT DOCUMENTS

| | | | |
|---|---|---|---|
| 1125647 | 11/1956 | France | 126/638 |
| 60163 | 4/1983 | Japan | 126/639 |

*Primary Examiner*—James C. Yeung
*Attorney, Agent, or Firm*—Kenyon & Kenyon

[57] ABSTRACT

A solar water heating system includes a water storage tank to which a hot water outlet pipe and a cold water inlet pipe are connected. A solar-collector unit is mounted below the water storage tank. A downcomer pipe connects the water storage tank and the lower portion of the solar-collector unit. A return pipe connects the upper portion of the solar-collector unit and the water storage tank. A tube member is installed in the water storage tank and interconnects the downcomer pipe and the return pipe. The solar-collector unit, the downcomer pipe, the return pipe, and the tube member form a loop that is filled with deionized water.

2 Claims, 8 Drawing Sheets

5,537,990

SOLAR WATER HEATING SYSTEM

BACKGROUND OF THE INVENTION

1. Field of the Invention

This invention relates to a solar water heating system, and more particularly to a solar water heating system which has a better heating efficiency and a longer service life.

2. Description of the Related Art

Solar water heating for domestic, commercial, or industrial purposes is one of the oldest and most successful applications of solar-thermal technology. The most widely used solar water heating system, and one that is suitable for use in relatively warm climates where freezing is a minor problem, is the thermosyphon type.

Referring to FIG. 1, a conventional solar water heating system is shown to comprise a water storage tank 10 which is provided with a hot water outlet pipe 100 and a cold water inlet pipe 102, a solar-collector unit 12 for collecting solar energy and for heating the water therein, a downcomer pipe 14 for transferring cold water from the water storage tank 10 to the solar-collector unit 12, and a return pipe 16 for transferring hot water from the solar-collector unit 12 to the water storage tank 10.

The hot water outlet pipe 100 and the cold water inlet pipe 102 are connected respectively to upper and lower portions of two opposite ends of the water storage tank 10. The downcomer pipe 14 and return pipe 16 are connected to lower and upper portions of the two opposite ends of the water storage tank 10. When there is no hot water running out of the water storage tank 10 from the hot water outlet pipe 100, the water storage tank 10 is in a closed state and therefore, cold water will not flow into the water storage tank 10 through the cold water inlet pipe 102.

The solar-collector unit 12 is a flat-plate type collector unit that is located below the water storage tank 10 and that is supported on the ground at an angle, as best illustrated in FIG. 2, in order to absorb incoming radiant energy and convert the same into heat. The downcomer pipe 14 is connected to a lower portion of the solar-collector unit 12, while the return pipe 16 is connected to an upper portion of the solar-collector unit 12. The solar-collector unit 12 has a plurality of interconnecting, parallel, water tubes 18 where the water is to be heated by solar radiation. The system is filled with water, and when the sun shines on the solar-collector unit 12, the water in the water tubes 18 is heated and becomes less dense than the water in the downcomer pipe 14. The heated water rises by thermosyphon action from the water tubes 18 through the return pipe 16 into the water storage tank 10, and is replaced by cold water from the cold water inlet pipe 102 through the downcomer pipe 14. This action continues as long as the sun shines on the solar-collector unit 12 with adequate intensity. In this way, the water temperature in the water storage tank 10 will continue to rise.

In addition, the water used in the system usually contains minerals which causes the formation of the fouling on the internal face of the water tubes 18 when the water is heated. The amount of fouling will gradually increase and forms a heat insulation layer which adversely affects heat transfer between the water and the water tubes 18. In addition, since the water is circulated in the system by the thermosyphon action, the diameter of the water tubes 18 must not be too large. Therefore, the water tubes 18 are likely to be blocked by the fouling after being used for a period of time, thus resulting in an unduly short service life.

SUMMARY OF THE INVENTION

It is therefore a main object of this invention to provide a solar water heating system which can prevent the formation of fouling in the solar-collector unit.

According to the present invention, the solar water heating system comprises a water storage tank having a hot water outlet pipe and a cold water inlet pipe connected thereto. A solar-collector unit is mounted below the water storage tank. The solar-collector unit has a downcomer pipe connected to a lower portion thereof, and a return pipe which connects an upper portion of the solar-collector unit to the water storage tank.

A tube member is installed in the water storage tank and interconnects the downcomer pipe and the return pipe. The solar-collector unit, the downcomer pipe, the return pipe, and the tube member form a loop. The loop is filled with deionized water.

Because there are no minerals in the deionized water, no fouling will be formed on the internal face of the water tubes of the solar-collector unit. Therefore, an effective heat transfer and a long service life can be assured with the use of the solar water heating system of the present invention.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
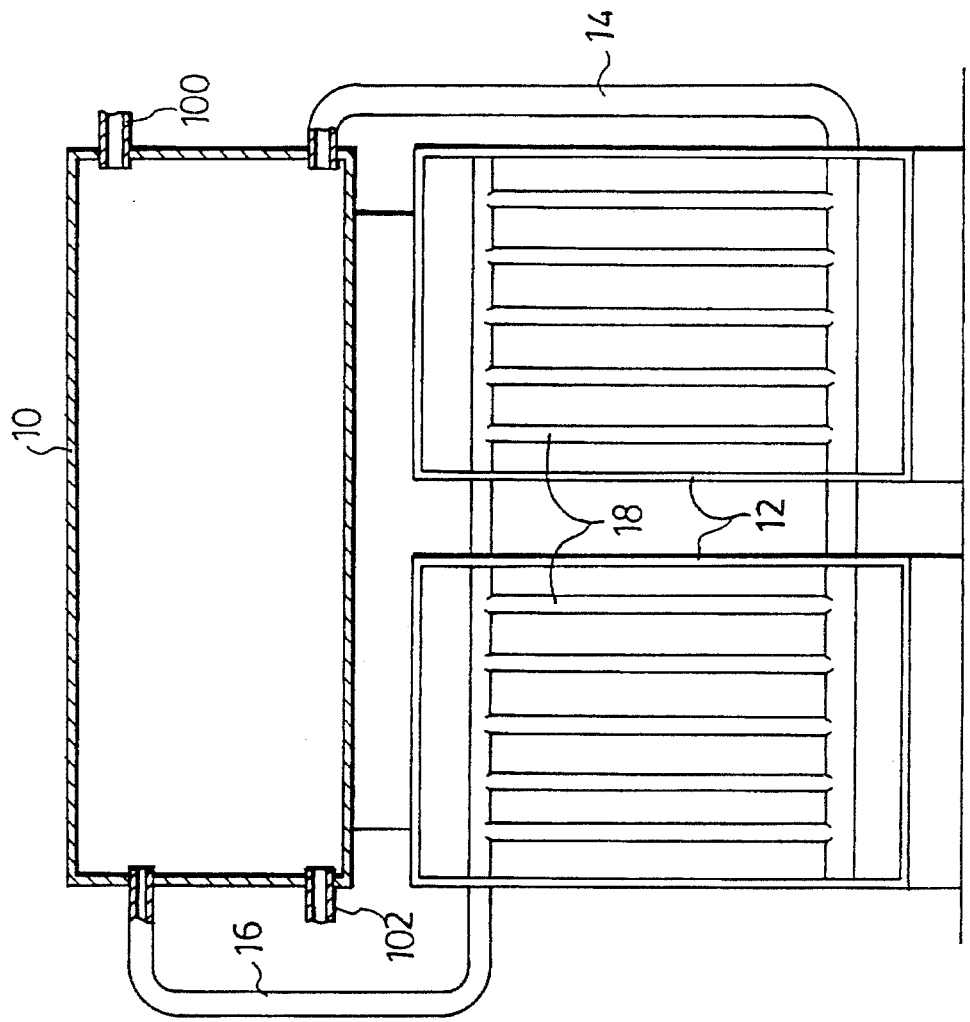
FIG. 1 is a partially sectional front view of a conventional solar water heating system.
Figure 2:
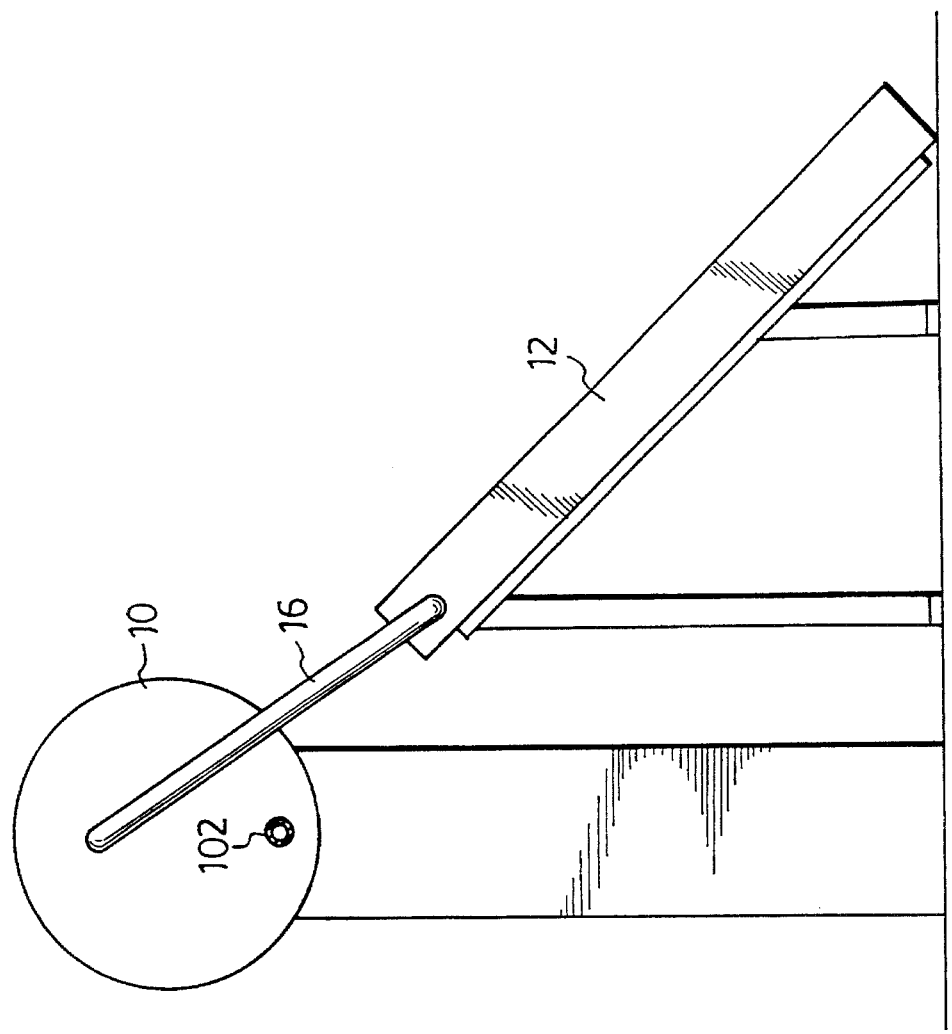
FIG. 2 is a side view of the conventional solar water heating system.
Figure 3:
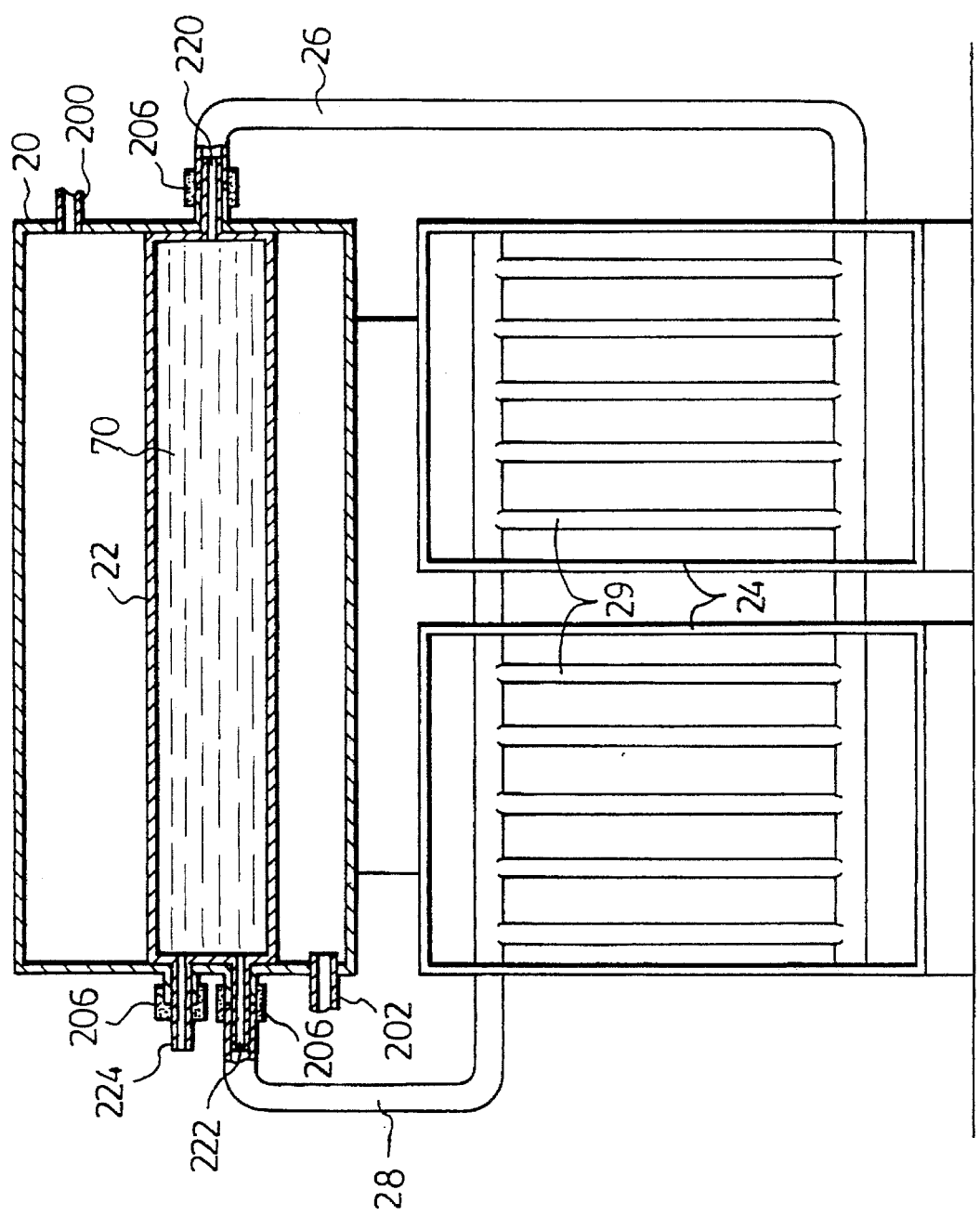
FIG. 3 is a partially sectional front view of a first preferred embodiment of a solar water heating system according to the present invention.
Figure 4:
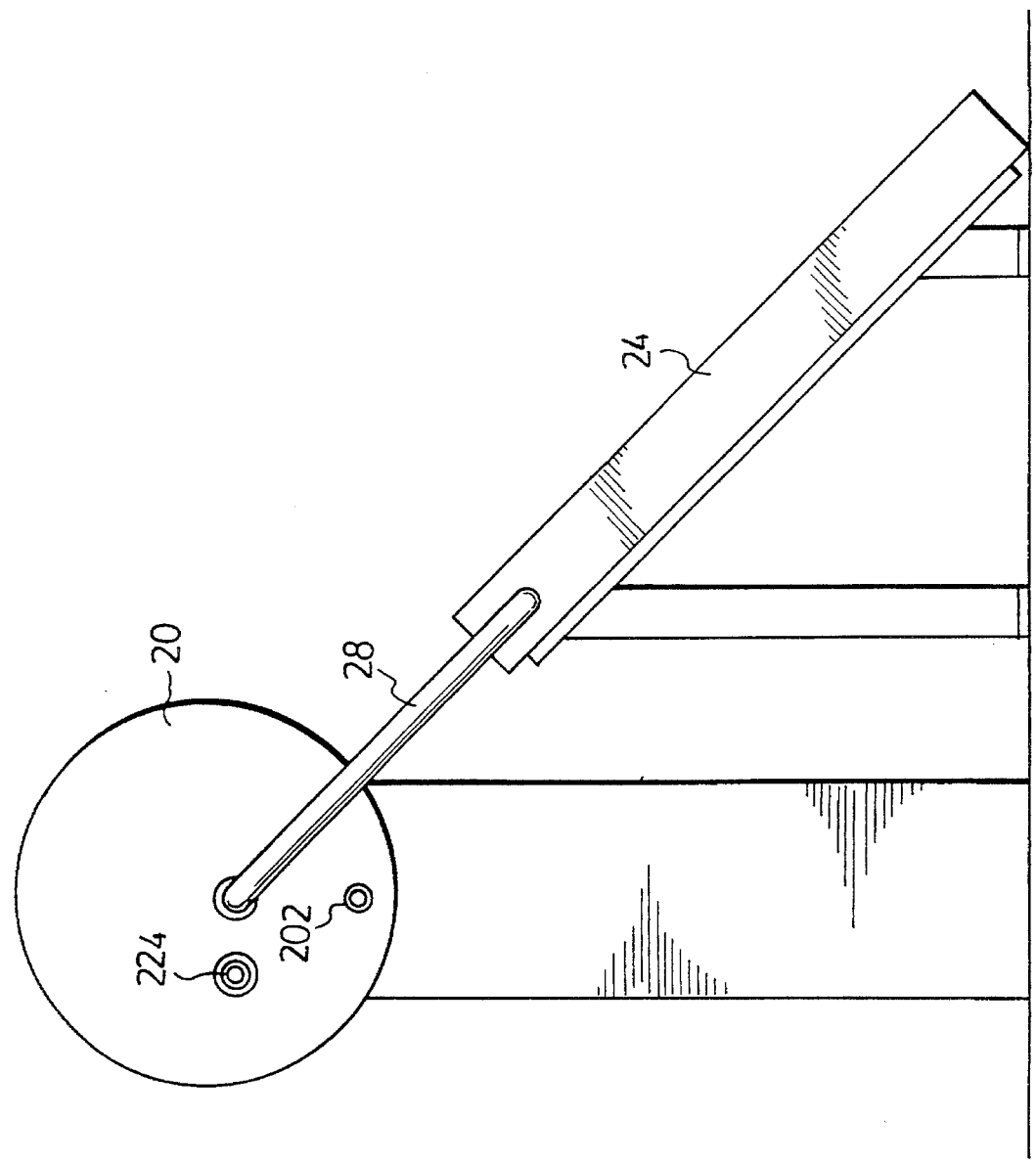
FIG. 4 is a side view of the first preferred embodiment of the present invention.

Referring to FIG. 3, the first preferred embodiment of a solar water heating system of the present invention is shown to comprise a water storage tank 20 and a solar-collector unit 24. The structures of the water storage tank 20 and the solar-collector unit are similar to those of the solar water heating system of the prior art. As mentioned in the description of the prior art, the water storage tank 20 has a hot water outlet pipe 200 and a cold water inlet pipe 202 connected thereto. The solar-collector unit 24 is a flat-plate type collector unit that is located below the water storage tank 20 and that is supported on the ground at an angle in order to absorb the incoming radiant energy and convert the same into heat, as best illustrated in FIG. 4. The solar-collector unit 24 has a downcomer pipe 26 connected to a lower portion thereof, and a return pipe 28 which connects an upper portion of the solar-collector unit 24 to the water storage tank 20. A plurality of interconnecting, parallel, water tubes 29 are provided in the solar-collector unit 24.

The feature of the present invention resides in that a tube member 22 is mounted in the water storage tank 20. In this embodiment, the tube member 22 is rectangular-shaped in cross section. The tube member 22 has a first end with an outlet port 220 that extends through one of the end walls of the water storage tank 20 and that is connected to the downcomer pipe 26. The tube member 20 further has a second end with a deionized water charging port 224 that extends through the other end wall of the water storage tank 20 and an inlet port 222 that extends through the other end wall of the water storage tank and that is connected to the return pipe 28. Thus, the water tubes 29 of the solar-collector unit 24, the downcomer pipe 26, the return pipe 28, and the tube member 22 form a loop. Sealing members 206 are provided respectively to the connections of the outlet port 220 and the downcomer pipe 26, the inlet port 222 and the return pipe 28, and the deionized water charging port 224 and the water storage tank 20 in order to prevent leakage at these connections.

Deionized water is charged into the tube member 22 via the deionized water charging port 224 in order to fill the loop with deionized water 70. When the sun shines on the solar-collector unit 12, the deionized water 70 in the water tubes 29 is heated and circulated in the loop. More specifically, the heated water rises by thermosyphon action from the water tubes 29 through the return pipe 28 and into the tube member 22. This action continues as long as the sun shines on the solar-collector unit 20 with adequate intensity. In this way, the water temperature in the tube member 22 will continue to rise. The water contained in the water storage tank 20 will be heated by the hot deionized water 70 in the tube member 22. The heated water of the water storage tank 20 will rise and flow of the water storage tank 20 through the hot water outlet pipe 200 and is replaced by cold water from the cold water inlet pipe 202. Therefore, the continued supply of hot water is ensured as long as the sun shines on the solar water heating system of the present invention.

Note that since there are no minerals in the deionized water 70, no fouling will be formed on the internal face of the water tubes 29 of the solar-collector unit 24. Therefore, an effective heat transfer and a long service life can be assured with the use of the solar water heating system of the present invention.

Figure 5:
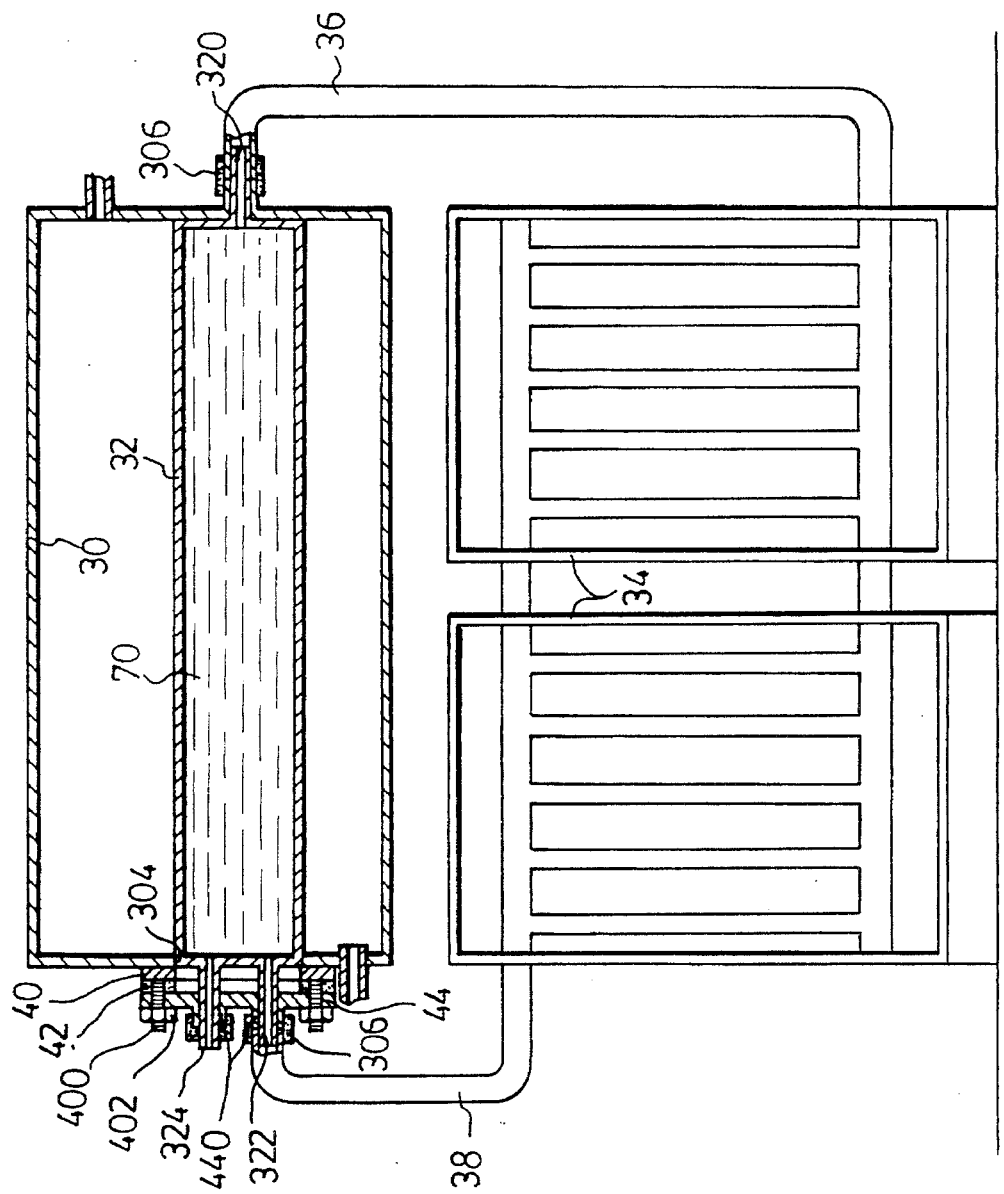
FIG. 5 is a partially sectional front view of a second preferred embodiment of a solar water heating system according to the present invention.
Figure 6:
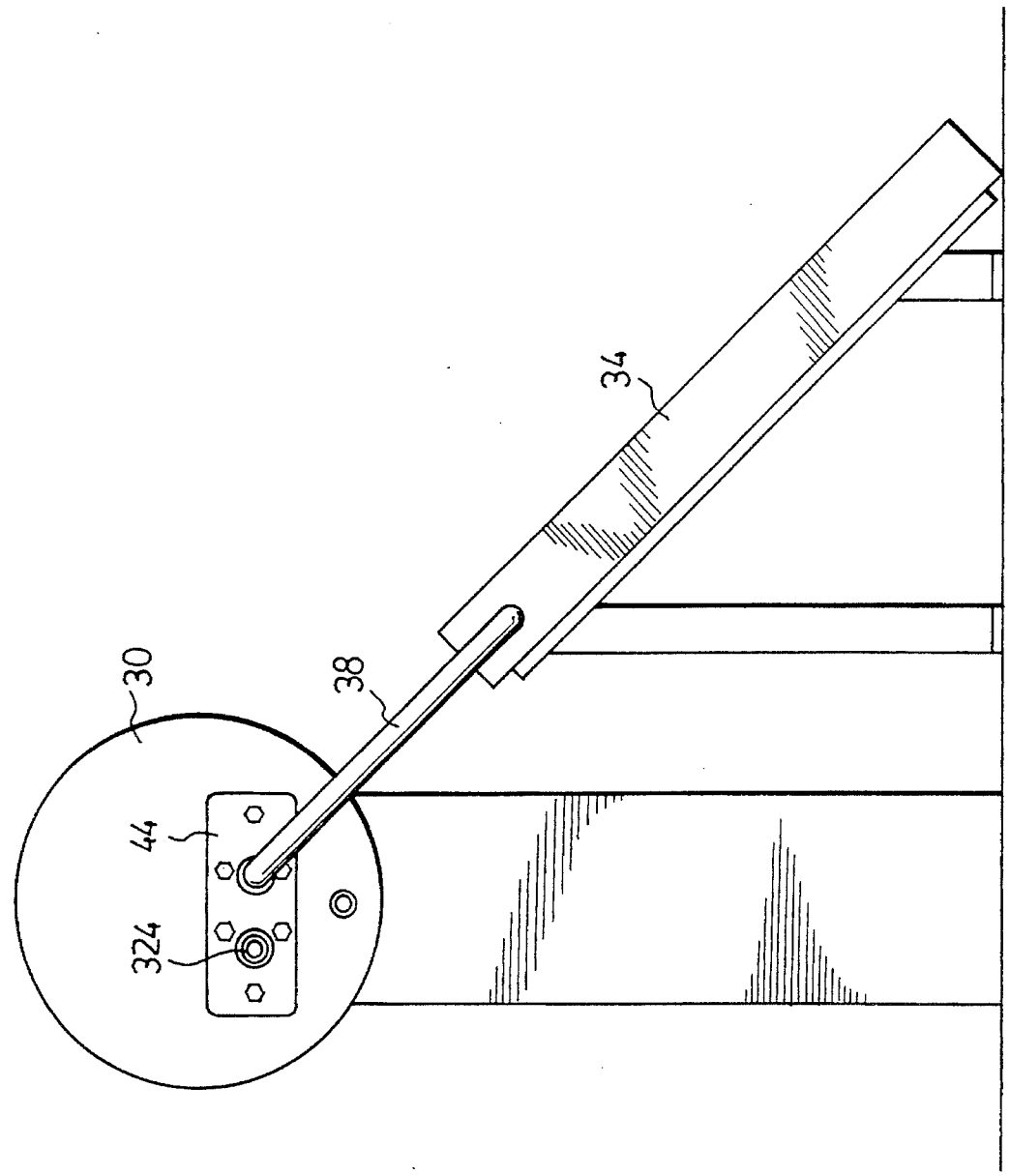
FIG. 6 is a side view of the second preferred embodiment of the present invention.

Referring to FIGS. 5 and 6, the second preferred embodiment of a solar water heating system of the present invention is shown to comprise a water storage tank 30, a tube member 32, a solar-collector unit 34, a downcomer pipe 36, and a return pipe 38. The structures of the tube member 32, the solar-collector unit 34, the downcomer pipe 36, and the return pipe 38 are similar to those of the previous embodiment and will not be detailed further. In this embodiment, the tube member 32 is designed so as to be removable from the water storage tank 30 for cleaning purposes. The structural features of the water storage tank 30 are described hereinbelow.

Figure 7:
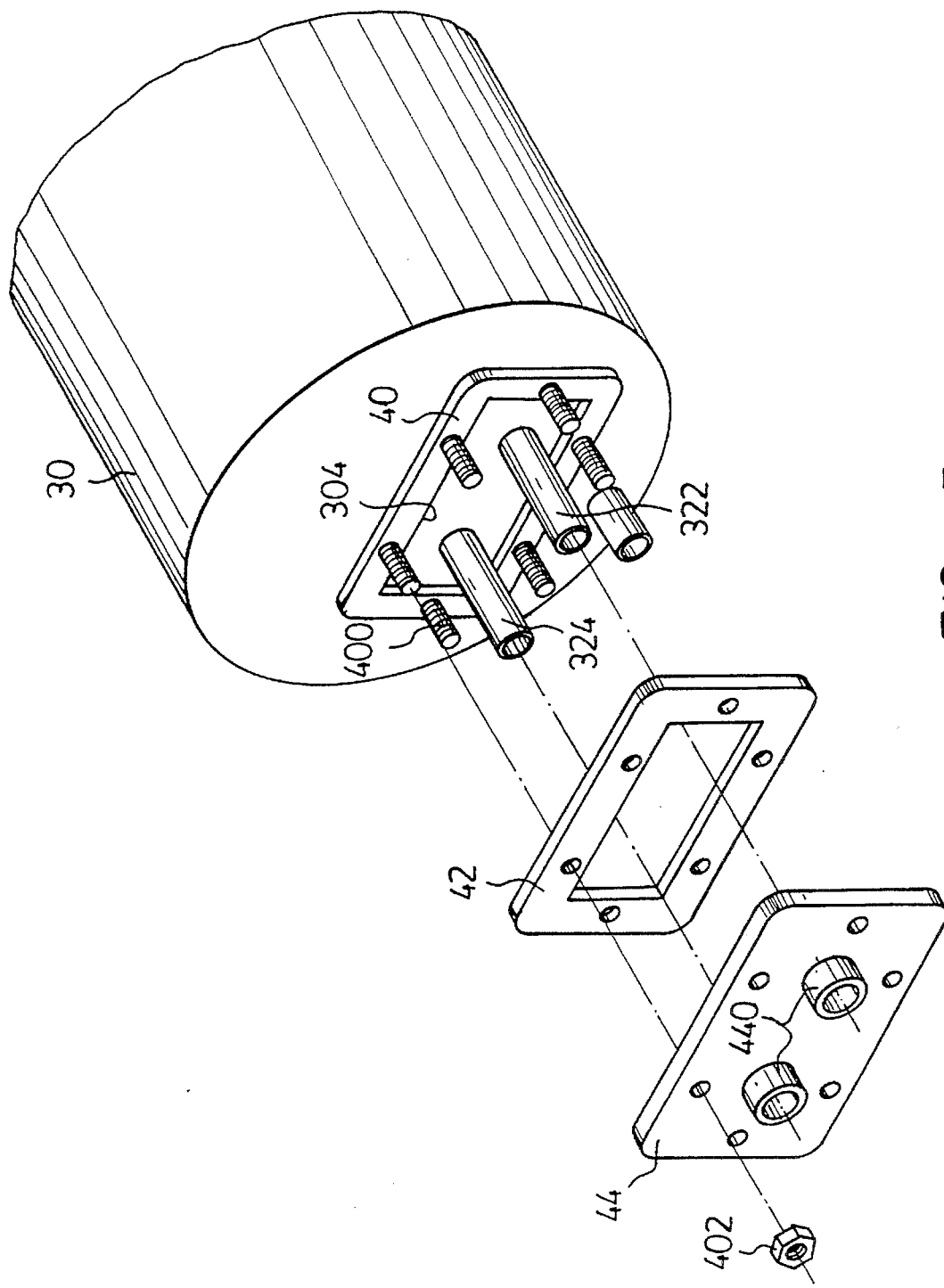
FIG. 7 is a fragmentary exploded view illustrating how an end of a tube member is connected to the water storage tank according to the present invention.

With reference to FIG. 7, the water storage tank 30 has an opening 304 with a periphery on which the second end of the tube member 30 is supported. A rectangular projection 40 is formed on the external face of the water storage tank 30 around the opening 304. The projection 40 has a plurality of threaded shafts 400 extending outward therefrom. A rectangular sealing ring 42 is attached correspondingly to the projection 40 and is passed through by the threaded shafts 400. A rectangular cover plate 44 is attached to the sealing ring 42 and is passed through by the threaded shafts 400 to close sealingly the opening 304. A plurality of locking nuts 402 engage the threaded shafts 400 to secure the sealing ring 42 and the cover plate 44 to the projection 40. The cover plate 44 has two sleeve members 440 through which the deionized water charging port 324 and the inlet port 322 extend respectively, as best illustrated in FIG. 5.

Sealing members 306 are mounted to a first connection of the deionized water charging port 324 and one of the sleeve members 440, a second connection of the inlet port 322 of the tube member 32 and the other one of the sleeve members 440, and a third connection of the outlet port 320 of the tube member 32 and the downcomer pipe 36. Thereby, leakage of water from the water storage tank 30 and the tube member 32 can be avoided.

Note that the tube member 32 may be removed from the water storage tank 30 by unthreading the locking bolts 402 from the threaded shafts 400 and by detaching in sequence the cover plate 44 and the sealing ring 42.

Figure 8:
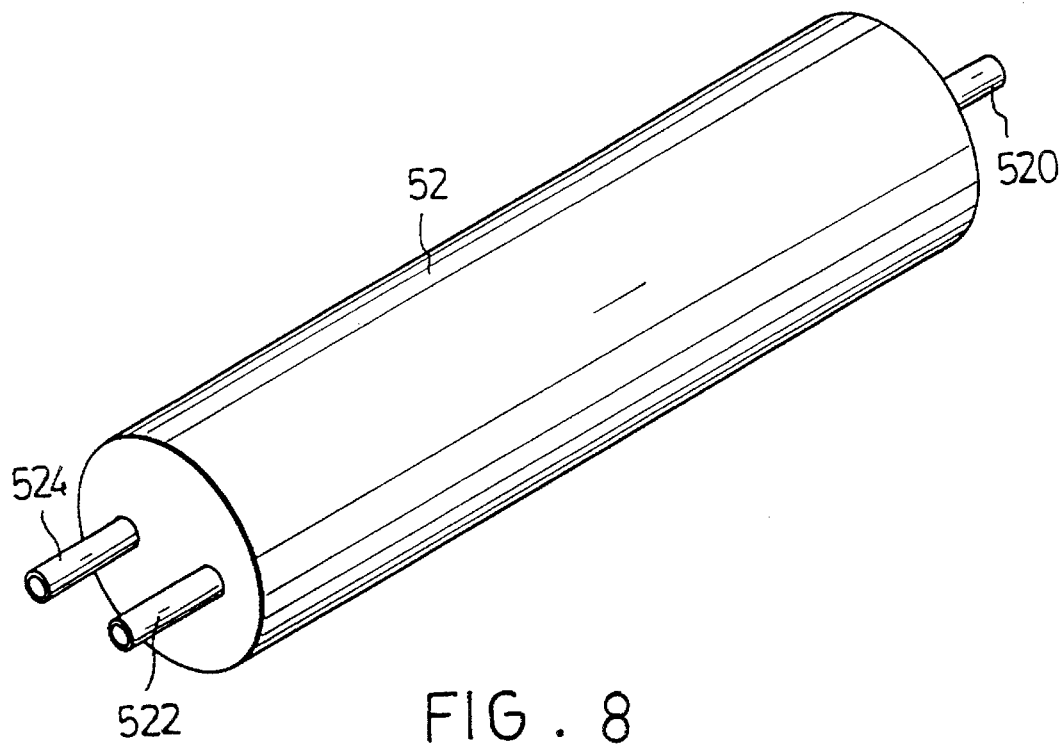
FIG. 8 is a perspective view of another preferred embodiment of the tube member of the present invention.

FIG. 8 shows another preferred embodiment of a tube member 52 according to the present invention. The tube member 52 is circular-shaped in cross section. The tube member 52 has a first end with an outlet port 520, and a second end with a deionized water charging port 524 and an inlet port 522.

Figure 9:
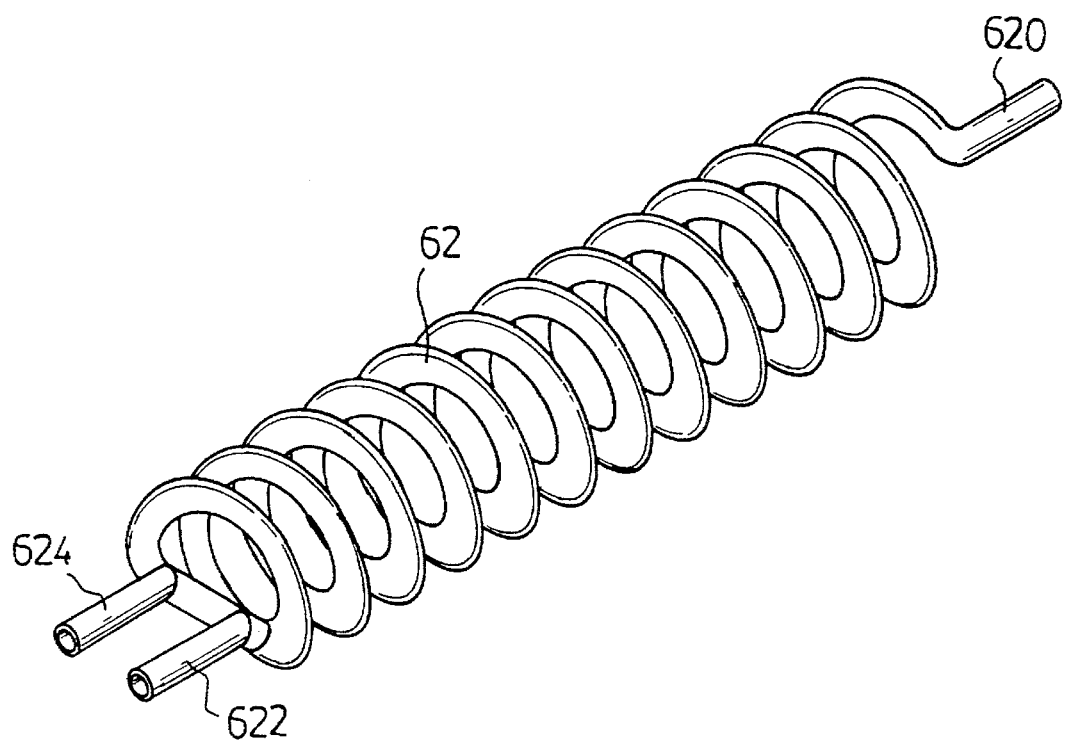
FIG. 9 is a perspective view of still another preferred embodiment of the tube member of the present invention.

FIG. 9 shows still another preferred embodiment of a tube member 62 according to the present invention. In the illustrated embodiment, the tube member 62 is a coiled tube. The tube member 62 has a first end with an outlet port 620, and a second end with a deionized water charging port 624 and an inlet port 622.

With this invention thus explained, it is apparent that numerous modifications and variations can be made without departing from the scope and spirit of this invention. It is therefore intended that this invention be limited only as indicated in the appended claims.

I claim:

1. A solar water heating system including:

a water storage tank having a hot water outlet pipe and a cold water inlet pipe connected thereto, and a solar-collector unit mounted below said water storage tank, said solar-collector unit having a downcomer pipe connected to a lower portion thereof, and a return pipe which connects an upper portion of said solar-collector unit to said water storage tank the improvements comprising:

said water storage tank having a tube member mounted therein, said tube member being connected to said downcomer pipe and said return pipe; said solar-collector unit, said downcomer pipe, said return pipe, and said tube member forming a loop, said loop being filled with deionized water, wherein said tube member has a first end with an outlet port that is connected to said downcomer pipe, said tube member further having a second end with a deionized water charging port and an inlet port that is connected to said return pipe, wherein said water storage tank has an opening with a periphery on which said second end of said tube member is supported, a projection being formed on an external face of said water storage tank around said opening, said projection having a plurality of threaded shafts extending outward therefrom, a sealing ring being attached to said projection and being passed through by said threaded shafts, a cover plate being attached to said sealing ring and being passed through by said threaded shafts to close sealingly said opening, a plurality of locking nuts engaging said threaded shafts to secure said sealing ring and said cover plate to said projection, said cover plate having two sleeve members through which said deionized water charging port and said inlet port extend respectively.

2. A solar water heating system as claimed in claim 1, wherein sealing members are mounted to a first connection of said deionized water charging port and one of said sleeve members, a second connection of said inlet port of said tube member and the other one of said sleeve members, and a third connection of said outlet port of said tube member and said downcomer pipe.

* * * * *